(12) United States Patent
Ercegovac et al.

(10) Patent No.: US 9,424,119 B2
(45) Date of Patent: Aug. 23, 2016

(54) QUERY REWRITES FOR DATA-INTENSIVE APPLICATIONS IN PRESENCE OF RUN-TIME ERRORS

(71) Applicant: International Business Machines Corporation, Armonk, NY (US)

(72) Inventors: Vuk Ercegovac, Campbell, CA (US); Carl-Christian Kanne, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 14/026,216

(22) Filed: Sep. 13, 2013

(65) Prior Publication Data

US 2014/0281748 A1   Sep. 18, 2014

Related U.S. Application Data

(63) Continuation of application No. 13/837,172, filed on Mar. 15, 2013.

(51) Int. Cl.
| | | |
|---|---|---|
| *G06F 11/07* | (2006.01) | |
| *G06F 17/30* | (2006.01) | |
| *G06F 9/44* | (2006.01) | |

(52) U.S. Cl.
CPC ......... *G06F 11/0775* (2013.01); *G06F 11/079* (2013.01); *G06F 11/0727* (2013.01); *G06F 11/0751* (2013.01); *G06F 11/0766* (2013.01); *G06F 11/0778* (2013.01); *G06F 11/0793* (2013.01); *G06F 17/3005* (2013.01); *G06F 17/30023* (2013.01); *G06F 17/30112* (2013.01); *G06F 8/00* (2013.01)

(58) Field of Classification Search
None
See application file for complete search history.

(56) References Cited

U.S. PATENT DOCUMENTS

| | | | |
|---|---|---|---|
| 6,081,835 A | 6/2000 | Antcliff et al. | |
| 7,152,204 B2* | 12/2006 | Upton | 715/239 |
| 7,657,501 B1 | 2/2010 | Brown et al. | |
| 8,549,119 B1 | 10/2013 | Singh et al. | |
| 8,990,176 B2* | 3/2015 | Wang | 707/696 |
| 2003/0225746 A1 | 12/2003 | Braun et al. | |

(Continued)

OTHER PUBLICATIONS

Sinha, Steven K. et al., "Tunable Fault Tolerance for Runtime Reconfigurable Architectures", IEEE, 2000, pp. 185-192.

(Continued)

*Primary Examiner* — Albert Decady
*Assistant Examiner* — Paul Contino
(74) *Attorney, Agent, or Firm* — Cantor Colburn LLP; Libby Toub

(57) ABSTRACT

An aspect of error handling includes a parsing block for pre-processing a document indexing application, a filtering block for discarding irrelevant documents, a transformation block to clean up and annotate input data by identifying a document language, and a processor configured for grouping inputs to collect documents for a same entity in a single spot. The processor processes a query operation. An aspect of error handling also includes a data package including a data result component that includes data generated based on successful completion of at least a portion of the query operation. The data package also includes an error information data component based on one or more errors encountered during processing of the query operation. An indicator separates the error information data from the data result. The system also includes a memory associated with a distributed file system for storing a final write output relating to the query operation.

8 Claims, 6 Drawing Sheets

Separate application and error modules

(56) References Cited

U.S. PATENT DOCUMENTS

| | | |
|---|---|---|
| 2003/0229677 A1 | 12/2003 | Allan |
| 2004/0015481 A1* | 1/2004 | Zinda ............................... 707/1 |
| 2005/0080765 A1 | 4/2005 | Dettinger et al. |
| 2005/0131926 A1* | 6/2005 | Chakraborty et al. ........ 707/101 |
| 2005/0154740 A1* | 7/2005 | day et al. ...................... 707/100 |
| 2005/0273723 A1* | 12/2005 | Sharpe ........................ 715/764 |
| 2006/0053106 A1 | 3/2006 | Bhaghavan et al. |
| 2007/0130231 A1 | 6/2007 | Brown et al. |
| 2008/0235199 A1 | 9/2008 | Li et al. |
| 2009/0043745 A1* | 2/2009 | Barsness et al. ................ 707/4 |
| 2009/0125579 A1 | 5/2009 | Saillet et al. |
| 2009/0204593 A1 | 8/2009 | Bigby et al. |
| 2009/0259634 A1 | 10/2009 | Honjo |
| 2010/0107047 A1 | 4/2010 | Amsterdam et al. |
| 2010/0107091 A1* | 4/2010 | Amsterdam et al. ......... 715/760 |
| 2011/0099502 A1* | 4/2011 | Kim et al. .................... 715/771 |
| 2011/0283112 A1 | 11/2011 | Dettinger et al. |
| 2012/0144234 A1 | 6/2012 | Clark et al. |
| 2012/0259832 A1 | 10/2012 | Walker et al. |
| 2013/0007847 A1 | 1/2013 | Plattner et al. |
| 2013/0262436 A1* | 10/2013 | Barsness et al. ............. 707/718 |
| 2014/0181137 A1 | 6/2014 | Stein |
| 2014/0195558 A1 | 7/2014 | Murthy et al. |
| 2014/0283096 A1 | 9/2014 | Neerumalla et al. |

OTHER PUBLICATIONS

Upadhyaya, Prasang, et al., "A Latency and Fault-Tolerance Optimizer for Online Parallel Query Plans", SIGMOD '11 Jun. 12-16, 2011, Athens Greece. 12 pages.

U.S. Appl. No. 13/837,172; Non-Final Office Action; filed: Mar. 15, 2013; Date Mailed: Apr. 14, 2015; 20 pages.

U.S. Appl. No. 13/837,172; Final Office Action, filed: Mar. 15, 2013; Date Mailed: Aug. 13, 2015; 16 pages.

\* cited by examiner

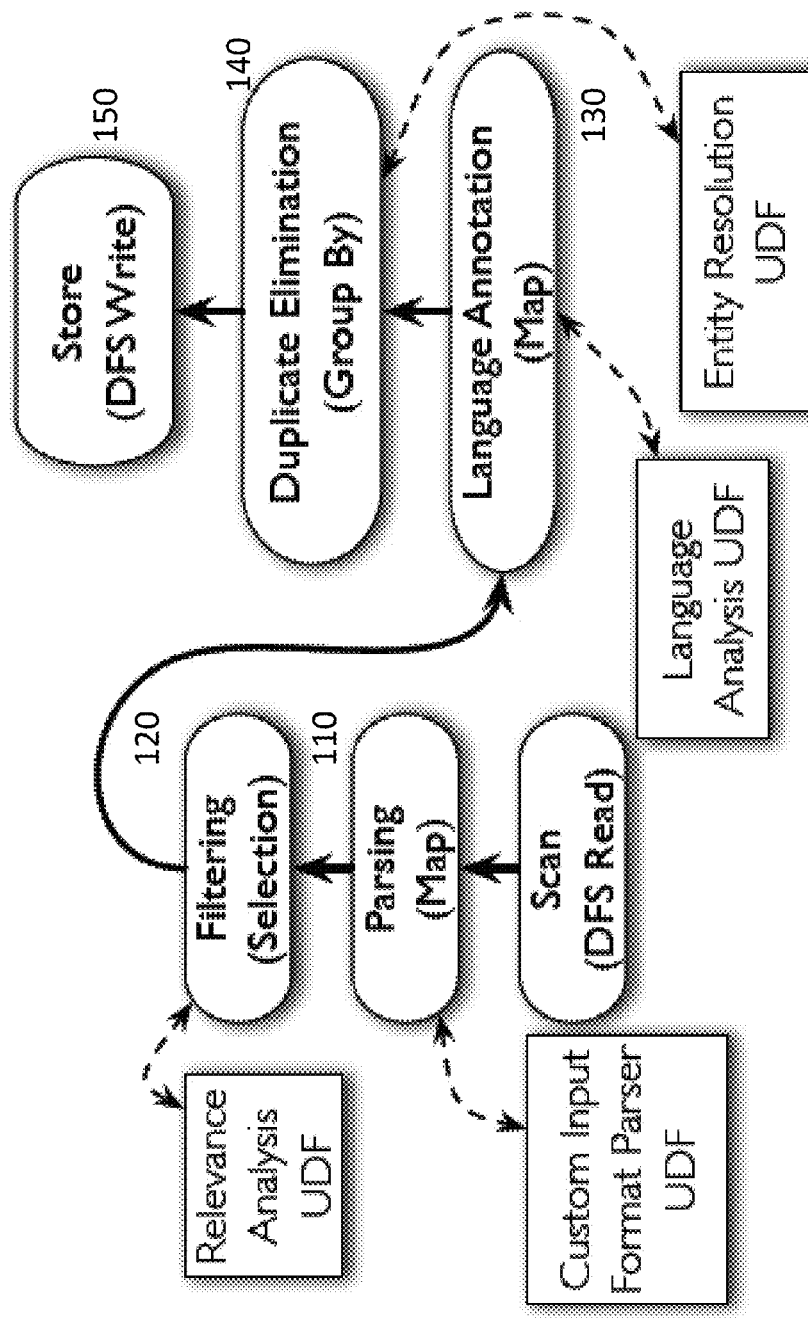
Figure 1: Document preprocessing data flow

```
1.  parse         = javaudf("org.some.parser.ClassName");
2.  isContent     = javaudf("org.some.relevance.Analyzer");
3.  findLanguage  = javaudf("org.isv.DetectLang");
4.  entityResolver = javaudf("org.isv.Resolver");

5.  corepipeline= fn(input)
6.    input
7.    ->transform {url: $.id,
8.                 doc: parse($.content, "lax")}
9.    ->filter isContent($.doc)
10.   ->transform {$.*, lang: findLanguage($.doc)}
11.   ->group by entity=entityResolver($).id
12.              into {id:entity, docs: $ };

13. read(hdfs("crawl.dat"))
14. ->corepipeline()
15. ->write(hdfs("toindex.dat"));
```

Figure 2: Document preprocessing flow in Jaql

```
 ...
 5.  corepipeline= fn(input)
 6.    input
 7.    ->transform catch({url: $.id,
 8.                     doc: parse($.content, "lax")})
 9.    ->filter catch(isContent($.doc))
10.    ->transform merge({$.*},
                      catch({lang: findLanguage($.doc)}))
11.    ->group by entity=catch(entityResolver($).id)
12.          into {id:entity, docs: $ };
 ...
```

Figure 3: Catch-style local exception handling

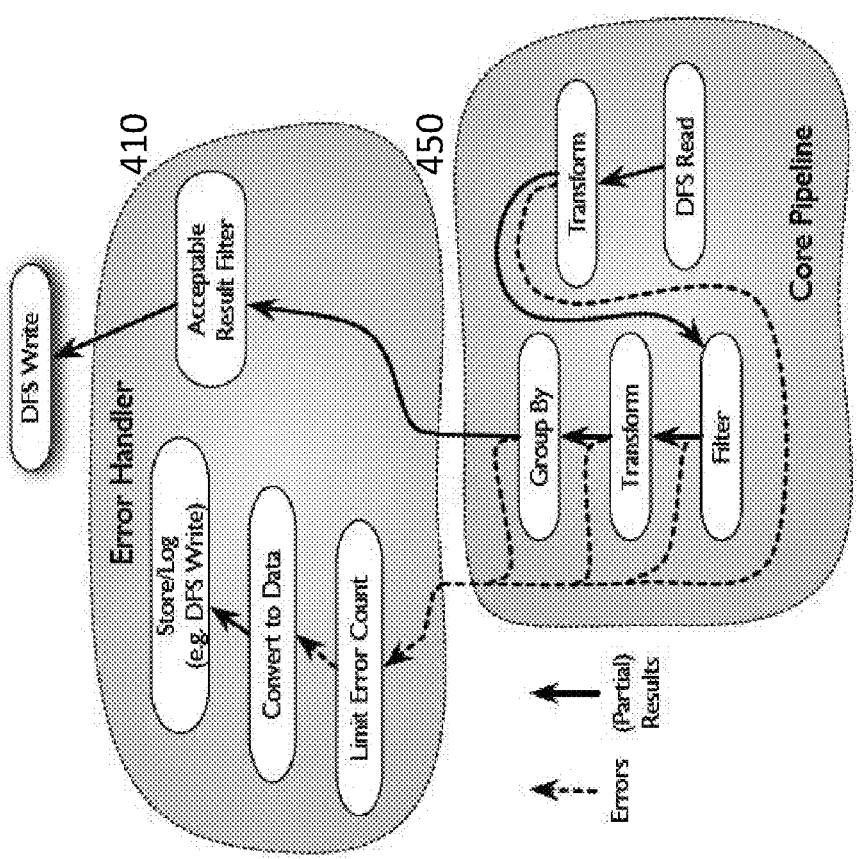
Figure 4: Separate application and error modules

```
13. errorhandler= fn(input)
14.   input
15.   ->limitErrors(UDFCall, 3000)
16.   ->tee(->errors($)->write(hdfs("error.log")))
17.   ->accept(schema [id, docs: [url,doc,lang?*]*])
18.   ->sanitize()

19. read(hdfs("crawl.dat"))
20. ->corepipeline()
21. ->errorhandler()
22. ->write(hdfs("toindex.dat"))
```

Figure 5: Composable error handler in Jaql

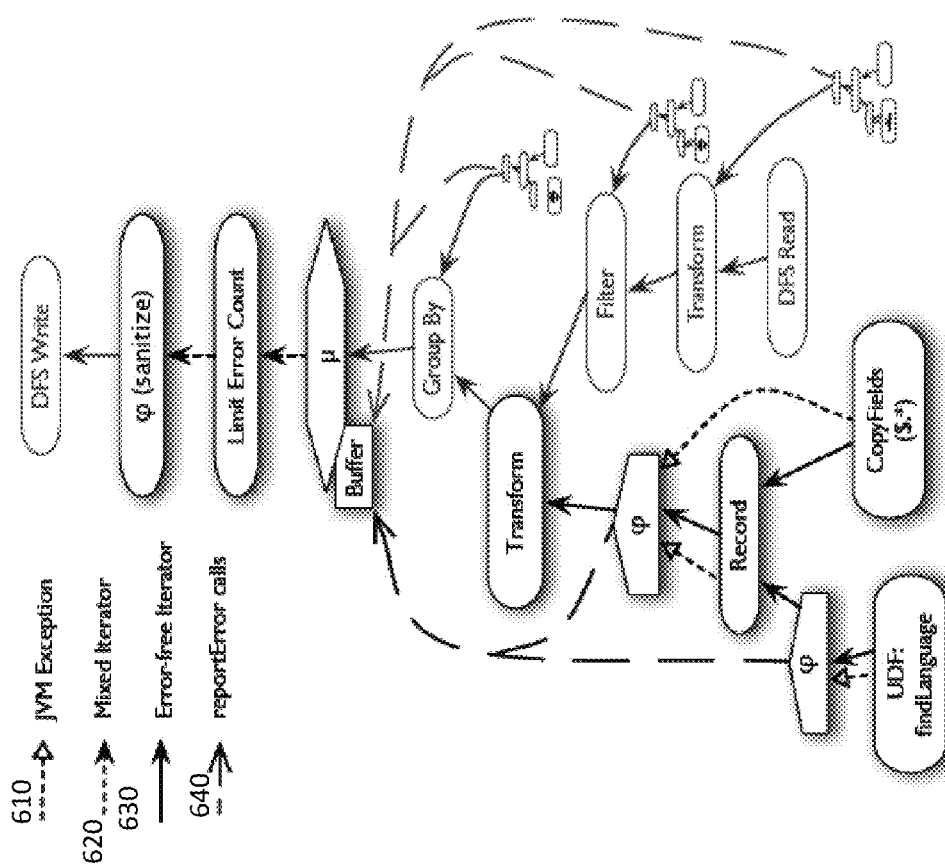
Figure 6: Execution plan with error operators

QUERY REWRITES FOR DATA-INTENSIVE APPLICATIONS IN PRESENCE OF RUN-TIME ERRORS

CROSS-REFERENCE TO RELATED APPLICATION

This application is a continuation of U.S. patent application Ser. No. 13/837,172, filed Mar. 15, 2013, the disclosure of which is incorporated by reference herein in its entirety.

BACKGROUND

The present disclosure relates generally to data processing and more particularly to handling query rewrites for data intensive applications in presence of run-time errors.

The rapid growth of digital technology has made data management a challenging task. This has created a recent demand for large-scale processing tools. This increase in demand has in turn inspired development of a number of declarative languages that can be compiled into execution plans for large clusters. Some common declarative languages include logic programming, functional programming and database query languages, such as SQL.

Declarative programming is a way of specifying what a program should do rather than how the program should do it. In imperative programming, the programming language is instructed to perform certain concrete steps to solve a problem that is well defined. However, when dealing with declarative programming, the programming language only indicates the essential characteristics of the problem and leave it to the computer to determine the best manner to solve the problem. For example, in a problem that requires students that scored more than 70 percent on a test, the programming language can either go through each record and determine when the condition is satisfied or quickly only take the top few records from every class and make sure that the condition is satisfied for them.

Declarative programming often considers programs as theories of a formal logic and computations as deductions in that logic space. One important reason that there has been an increased interest in declarative programming is that it allows parallel programs to be used which greatly simplify processes and perform operations quickly and efficiently.

BRIEF SUMMARY

Embodiments include a system for error handling. The system is includes a parsing block for pre-processing of a document indexing application, a filtering block for discarding irrelevant documents, a transformation block to clean up and annotate input data by identifying at least one document language, and a processor configured for grouping inputs to collect documents for a same entity in a single spot. The processor processes a query operation. A data package includes a data result component having data generated based on successful completion of at least a portion of the query operation. The data package also includes an error information data component based on one or more errors encountered during processing of the query operation. An indicator separates the error information data from the data result. The system also includes a memory that is associated with a distributed file system for storing a final write output relating to the query operation.

Additional features and advantages are realized through the techniques of the present disclosure. Other embodiments and aspects of the disclosure are described in detail herein.

For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

FIG. 1 depicts a document preprocessing flow according to one embodiment of the present invention;

FIG. 2 depicts a document preprocessing flow according to one embodiment of the present invention;

FIG. 3 depicts a process flow for a catch style local handling according to one embodiment of the present invention;

FIG. 4 depicts a process flow showing an error handler with separate application and error module handling according to one embodiment of the present invention;

FIG. 5 depicts a process flow for a composable error handler according to one embodiment of the present invention; and FIG. 6 depicts a process flow for an execution plan with error an execution plan with error operators according to one embodiment of the present invention.

DETAILED DESCRIPTION

FIG. 1 is an illustration of a data flow showing the pre-processing of a document indexing application. It consists of an initial parsing block 110, a filtering block 120 that discards irrelevant documents (such as page-not-found conditions), a transformation to clean up and annotate the input data by identifying the document language 130, a grouping step that groups inputs to collect documents for the same entity in a single spot 140, and a final write that stores the output in a distributed file system 150. The data flow is specified on a logical level that does not imply any physical execution plan, but it is typically executed on a cluster of machines in parallel.

Relational database languages use specific query languages such as SQL to store, retrieve and manipulate stored data. Sometimes query functions are used to process these commands to the target database. For example a query operation using a select command may be used to retrieve data from the database, while one that encapsulates an insert commands may be used to add new rows of data to a database and even one that uses an update command can be used to modify the rows of data. This method of data processing has many advantages, but error handling remains difficult when using query functions. Of particular challenge, are those applications that use declarative programming and incorporate query function(s).

In many applications involving declarative programming, graceful degradation is needed in the presence of run-time errors. This involves producing as many partial results as possible without having to introduce error handling code all over the query expression. A query expression can be defined as a query that is expressed in a query syntax. It can consist of a set of clauses written in a particular way such as in a declarative syntax. For example, q query expression may have to begin with a from clause and end with a select or group clause.

Many data-intensive applications tolerate some data loss, and can successfully use incomplete results. A comprehensive treatment of every potential error case is often not cost effective, and queries can be used productively by ignoring some of the input data or intermediate results. This is a challenge for existing query processing systems, however, they do not continue query evaluation once a run-time error occurs. Without any additional knowledge about the errors this is the only reasonable approach, because there is no information about what constitutes an "acceptable partial result" for a particular query in a particular context. Fault tolerant mechanisms provide partial solutions for non-deterministic error conditions.

A non-deterministic error condition is usually caused by error conditions such as hardware failures or resource exhaustion. A deterministic run-time error condition, on the other hand, is often caused by software and is harder to manage. In addition, certain errors can make partial results useless or even harmful. For specific scenarios and operators, however, existing systems often provide alternatives. For example, bulk-load operators typically allow ignoring of a configurable amount of errors. This need for robust processing is emphasized in data intensive workloads, where distributed cluster environments and long query run-times make debugging harder, giving rise to sophisticated tools to instrument execution plans. However, there is no principled approach currently on how to generalize error-aware variants to all of the operators in a system while following the paradigm of declarative query.

Deterministic run-time errors are challenging. Once queries meet real, large-scale data in production, deterministic run-time errors become a serious issue in particular. The large volume of input data is often unprocessed, and queries are exploratory, triggering many unexpected corner cases that raise exception conditions. The use of third party libraries and user-defined functions (UDF) to parse, clean and annotate data compounds the issue by introducing error sources outside the application developer's control.

According to one embodiment of the present invention, a technique will be discussed using the flow process of FIG. 1 that has a high tolerance against only partially processed inputs. The document index will provide value even if it is incomplete. Just because one document fails the parsing process, this should not prevent the remaining documents from being imported. Likewise, just because the language analysis fails does not mean that the document should not be indexed. Of course, the viability of a partial result may change depending on context of a query. In one example, the preprocessing pipeline may be used for indexing an intranet, or to index a legal document collection. These applications may have very different tolerance levels to errors, although the core application code is identical. Another concern is that if errors are tolerated, and there is a way to continue processing, they still need to be reported, and possibly processed using some error-specific logic. Writing errors into log files which are inspected manually or using separate tools is the norm. However, this introduces side effects to read-only queries, and defers availability of error information to subsequent stages, possibly requiring additional passes over the data to apply alternative processing strategies to problematic cases.

In accordance with one embodiment, four desirable features of error handling can be identified for query processing environments and as per this embodiment as will be discussed later, these four features are provided. The first desirable feature is a query processor for data-intensive applications should be able to produce partial results even if some operations fail. The failure units should be as small as possible, i.e. data and computation that is independent of the failure should not be affected. Second, the error handling logic should be specified declaratively, independent of a physical execution plan or control flow. Third, error reports should not be side effects. Side-effect based error reporting makes it difficult to specify error handlers and regular logic separately as independently composable pieces of code, and prohibits some optimization techniques. Lastly, a unified data model that includes partial results and error values enables generation of combined execution plans for errors and data in a single optimizing compiler.

In one embodiment, a novel data type to represent results of partially failed computations is provided. Subsequently, this can be used to show how existing query operators can be extended in a principled way to operators that tolerate errors. In another embodiment, an "acceptable partial result schemas" will be introduced as a declarative specification mechanism for error tolerance. In addition, in another embodiment a method is introduced to allow the compiler to automatically infer a proper error handling strategy based on the acceptable result specifications. Furthermore, new query language constructs for error handling will be discussed and corresponding algebraic operators in will also be introduced. The methodology will include discussion about how the compiler chooses error-aware operator variants given a declaration of error tolerance.

To provide a better understanding, a query language is provided as an example. However, as those skilled in the art appreciate, many other languages can be used and this is provided only for clarity. The language that would be used is "Jaql" due to its flexible data model and extensibility. Jaql is a declarative scripting language for use with Java. Its design features are 1) a flexible data model; 2) reusability; 3) Varying levels of abstraction and 4) scalability. Jaql is used in some embodiments for analyzing large semistructured datasets in parallel, such as those using Hadoop. Hadoop® is an open source software framework supported by Apache®. Hadoop runs on large clusters of hardware and implements a computational paradigm named Mapreduce where the application is divided into many small fragments of word. Each of these fragments may in turn be executed on any node in the cluster in a computer processing environment. Hadoop supports a distributed file system that stores data on the compute nodes thus providing high aggregate bandwidth across the computing cluster. Both map/reduce and the distributed file system are designed so that node failures are automatically handled by the framework A brief review of the core Jaql language is provided so that it becomes more clear as how the language incorporates traditional aspects such as local catch-style exception handlers. It should be noted that Jaql queries are deployed to Hadoop clusters which will also be briefly discussed.

The Jaql Language—The Jaql language is a query language for data-intensive systems. Its compiler, run-time and libraries are available as an open-source version and are part of many products such as IBM® Info-Sphere Biglnsights product. It is a functional language with a flexible data model (including semi-structured objects and higher-order functions). The compiler and run-time system can execute queries in parallel on Hadoop clusters. A more in-depth discussion of the language constructs and system details can be provided in reference with FIG. 2.

FIG. 2 is a translation of example from the introduction into a Jaql script that has been considerably simplified to illustrate the basic concepts. Jaql scripts consist of statements that are either assignments, or expressions. The first lines of the script import user-defined functions, in this case written in Java, and make them callable using simple local identifiers. The script then defines the corepipeline as a function taking a stream of documents as input. The Jaql expressions shown in lines 7-12 correspond to the pipeline stages that are illustrated in FIG. 4. Finally, a query expression on lines 13-16 reads input data, processes it with the corepipeline function and writes the result back to the (distributed, see below) file system. The -> symbol is used to compose the pipeline and offers syntactic convenience that naturally illustrates values flowing from one function (left-hand side) to the next (righthand side). Data Model: Jaql's Data Model (JDM) is based on JSON (RFC 4627). A JDM value is either atomic (e.g., string, long, etc.) or composite. Data can be deeply nested using two composite types: Arrays (also referred to as collections below), and records, which are a set of string names that map to JDM values. This approach, as will be discussed later, can be slightly simplified in one embodiment especially for different data models to avoid burdening of presentation with special cases for each type. In one embodiment, it is assumed that every value is a collection, representing atomic values by singleton collections, and records by collections of name/value pairs.

Referring back to FIG. 2, an example of a document pre-processing flow is illustrated. On line 13, Jaql's read function produces an array of records that represent crawled documents. A simplified, textual representation of an array that corepipeline consumes is [{id: 123, content: "<html>..."}, ...]. Jaql includes a schema language that is used to describe constraints on data. For example, a schema {id: long, contents} matches records with one id field of type long, and one contents field that may have any type, including nested structures. Record fields may be declared optional, e.g. {id:long, contents?} matches records as in the example above, but also matches records that only have an id field. The output schema of the above-mentioned read operation is written as [{id:long, contents: string}*], designating an array with arbitrarily many records as described above. Core Expressions: Each core operator in Jaql consumes and produces an array. For example, the transform expression maps each input value to a new value. On line 7, the transform outputs a new record for each input record, renaming the id field to url and retaining only the extracted data under the doc field. The $ in the transform expression is Jaql's default iteration variable name that is bound to each value of the input array. The other expressions (filter, group by) make use of $, which is similarly defined in their context. In addition to standard query language operators such as transform, filter, join, group by, Jaql includes additional operators which will be introduced as needed.

Map Deployment—In a MapReduce programming model, programs processing large data collections are specified as two pure functions, map and reduce. In the first phase, the map function is applied to each input item, and produces a set of key/value pairs. In the second phase, the reduce function is invoked for each distinct key with the set of map outputs for that key. MapReduce runtimes are designed to execute on clusters with a large number of nodes, and input and output files are stored in a distributed file system on the cluster. The results of the map function are stored locally, but remotely accessible files of each node, and a central coordinator realizes fault tolerance and task scheduling, re-executing work if there are node or network failures. The Jaql compiler transforms an input query expression into a Directed Acyclic graph (DAG) of MapReduce jobs that are run on an Hadoop cluster. The Hadoop jobs are represented in the Jaql runtime as low-level operations.

Jaql Catch Handlers—The conventional approach to error management is the use of local "catch" exception handlers. Jaql realizes them in form of a catch function that returns an alternative result, provided as second argument, if there is an error when evaluating its first argument. The default alternative result is the empty collection. The occurrence of any such errors is logged to a file. Assuming one goal is to tolerate errors in all of the UDFs, in one embodiment the query can be modified as shown in FIG. 3. The transform and filter operators are defined such that they skip input items if the parameter expression yields an empty sequence, such that the application of catch will now skip problematic data. Similarly, the group by operator will skip any items for which the grouping key is determined to be the empty sequence. In the second transform, it is desired to want a different error behavior. In other words, if the language analysis UDF fails, the goal is not to drop the record, but just omit the lang field from the result record. This effect can be achieved by guarding the language analysis in a separate catch, and using function merge( ) to merge the two records into one. If constructing the second record fails, the result of catch is an empty record, which is a valid input to merge. The downsides of the catch-based approach above have been discussed in the introduction: core pipeline is less readable. The error handling logic is coupled to the application logic, and not specified separately in a compositional way. Errors are reported as side effects in a log, reducing optimization opportunity. Finally, core pipeline is not reusable in contexts with different error handling needs.

A Robust Query Language—The basic exception handling model presented above means that evaluation of an expression can have two mutually exclusive outcomes, either a result is obtained, or an error. Exception handlers allow for conversion of error outcomes to regular data results. A different approach to specifying error handling policies is provided in this embodiment by allowing every expression to have both errors and regular data as a result. One way of looking at this model is to view every query operator as having two outputs instead of one, one for regular data and one for any errors that occurred. The error values are objects with attributes that further describe the error that occurred.

Referring back to FIG. 4, this figure is an illustration of one the scenarios discussed in conjunction with discussion of FIG. 1, according to one embodiment, having secondary error data flow. In this model, regular query operators are not error-aware. They only act on the data output of their sub-expressions, passing the secondary error output through (even adding errors of their own). A few error aware operators can access both regular and error inputs, and transform, monitor, drop or merge them. In this language design, a novel error container data type is provided to represent results of erroneous computations. Its instances contain both partial results and the set of errors that occurred. Operators may return either regular results, or an error container. All query operators and expression types are polymorphic, and accept both regular input types and error containers as input values. If possible, operators are applied to the partial result component of their inputs to continue processing in the presence of errors. The precise semantics of this model, and how to redefine existing operators to deal with (partly) error-containing inputs, is described later. For now, only a brief tour of the language constructs from the developer's perspective will be discussed, as shown in FIG. 4.

In this embodiment, the composable error handlers and gray "error handling" region of the query as referenced by 410, in general, can be written and modified independently from the core query functionality 450. In fact, in one embodiment, it can be separately packaged into a module to be reused for other applications.

In FIG. 5, the core processing pipeline (all lines up to 13) remains unchanged from FIG. 2. In this embodiment, error handling and application logic are separated in different functions. However, core pipeline may output an error container with a partial result, which is then processed by the error handling function. The error handling function checks that certain tolerable error limits have not been reached, writes any errors to a log file, and "sanitizes" the output, i.e. turns it into a regular data set that is then written as output.

Returning the Partial Result—The error handler receives the output of core pipeline as input, and applies an error handling policy to it, using operators that can deal with error containers. The ultimate output is produced by calling sanitize( ) (line 18), which extracts the partial result of the error container, making it indistinguishable from a regular result. As for logging errors, the tee operator (line 16) splits processing similar to the UNIX shell tee command, and corresponds to the fork of the two data flows between the bubbles (FIG. 4), the tee returns its input unchanged. This also applies to the parameter expression of the input. The compiler translates tee( ) into an execution plan that allows to process both forks in a single MapReduce job. In this embodiment, the parameter expression makes use of errors( ) the complementary function to sanitize( ) which extracts just the set of errors from an error container. The extracted error values describe the error by providing details such as an error message, type, and source location. The error values are converted to regular records whose attributes hold the error details. These are written to a log file using regular I/O operation. The user can, as additional parameter to errors( ) supply certain identifiers that refer to the execution engine's state. Their value at the time the error occurred is included as an error attribute, and is typically used by the error handling code to extract the culprit data that caused the error. In one example, the currently processed record is included with the error value.

Error Limits—Looking back at FIG. 4 and in line 15 of FIG. 5, the program includes commands to terminate processing early if the result quality does not meet the application requirements, specified as an error threshold for certain types of errors. Inspired by STOP AFTER-style processing in SQL [5], a specialized operator can be provided that allows the declaration of an error count limit for a particular class of errors. Only some subset of the partial result is returned if the limit is violated. The class of errors is specified as a user-definable predicate on the error value, in this embodiment, a library function that is true for errors raised in UDF calls. There is another version of this operator that limits, for a given window size of the input, the relative error rate instead of the absolute error count.

Declaring Acceptable Partial Results—A big challenge when applying operators to partial results of computations is that there are multiple candidates for the resulting query semantics, such as the granularity at which partial results are acceptable. Referring back to FIG. 3, this concept was illustrated by the two different placements of catch in the two transform operators. To express this declaratively and separately, via the error handler, it is optimal for the system to infer the proper placement of exception handling primitives based on a declarative specification of acceptable output. This is realized in this embodiment using acceptable schema declarations. The inferred schema after the group by statement is [{id, docs: [{url,doc,lang}*]}], which designates an array of records with two fields, id and docs. The second field's schema is a nested array of records with three fields for document url, contents and language, respectively.

An acceptable schema representation that provides the same execution plan as the explicit catch handlers from FIG. 3 is shown in line 17 of FIG. 5. This simply declares the lang field to be optional. The schema argument used for accept( ) must be a supertype, (i.e. more permissive than, the actual inferred schema of its output. The declaration of an accept schema means that the application can tolerate some computations in its input expression cannot be performed. This is as long as the input of accept( ) still matches this schema, the application can tolerate if some computations in its input expression cannot be performed.

The compiler places exception handling operators in the execution plan that produces partial results without violating the declared schema. Another view is to regard the operators such as record construction and transform as being overloaded, with a number of variants that behave differently with respect to errors, and the compiler automatically selects the proper variant based on the expected type declared in accept( ). Sometimes, the acceptability of a partial result is not based on its structure. This is why in one embodiment, additional, non-structural schema properties is also provided to control error tolerance for certain parts of a result. For example, in one embodiment, it is permitted to declare that some parts of the result must not be "tainted" (i.e. must not be based on partial results of a computation that had some errors).

The error-aware query algebra—In most query processing systems, efficient translation of queries to execution plans is based on a query algebra. In this embodiment, a query algebra with operators that are defined not only on regular data, but also on an error container type that represents the results of computations that had errors, are introduced. In addition to this data type and a corresponding suite of error handling operators, the approach provides an explanation for how to lift regular, error-unaware operators into error-aware counterparts that also accept error containers as inputs and treat them in a uniform and predictable way. In one embodiment, a family of Monads that express computations with partial results are introduced.

Let's assume that objects in this system are immutable and have no identity. Each operator is an n function that takes collection-valued input and produces a collection as an output. A vector notation as explained earlier in the language section, one should assume that all operations are that are not naturally defined on collections (e.g. basic arithmetic, comparisons, etc.) use singleton sets as input and/or output. Records are represented as collections of name/value pairs.

Errors as data: In one embodiment, errors are presented as data values. Two data types can be provided as follows. The first data type is a base type and is used to capture information about single runtime errors. To realize a secondary error data flow in addition to the regular data, an error container type can be presented. The later represents the result of a computation that has raised errors.

By comparison, error values are provided in this embodiment as just another basic type of data error similar to the type of records already discussed. A value of this type describes an error using some attribute values. The precise set of attributes varies for different environments and is not particularly important for this discussion. Some examples may include (but are not limited to error messages) type of expressions causing an error (e.g. "UDF call", or "Arithmetic Expression"), the exception class name representing the error, and the module, class and approximate location in the query source code of the expression that caused the error.

Error containers can also provide instances of the type of data/error represented as the outcome of an erroneous computation. These can contain one or more error values, and, optionally, a collection of regular data values in one embodiment. The regular data values are a partial result that could be salvaged from the computation, and the errors represent the secondary error data flow. ((P,E) is defined as a single error container with a partial result P and a set of error values E in the following discussions). Error containers can only occur as a top-level type of a value, they are never nested. Nested error containers would make the model unnecessarily complex and difficult to implement. To define error-aware operators, in one embodiment a need to merge the output of an operator with additional error outputs may be present. The proper result value type is created using the auxiliary μ function, which unnests or omits error containers as necessary:

$$\mu(P, E) := \begin{cases} P & \text{if } E = \emptyset \\ \varepsilon(P', E' \cup E) & \text{if } P = \varepsilon(P', E') \\ \varepsilon(P, E) & \text{otherwise} \end{cases}$$

Errors as operator results—In some systems, there frequently are inputs to which operators cannot be applied. This may be due to operator semantics (e.g. index out of bounds errors), limited resources (e.g. configured buffer sizes), or programming errors. In existing query algebras, there is usually no representation for such errors, with the possible exception of special domain values, such as NULL or NaN (not a number) for specific operations. In error-aware algebra model, the occurrence of errors using error containers is provided. If there was an error during the evaluation of an operator, it returns an error container instead of its regular result. An error container without partial result models the case where the operator throws an exception.

One of the goals for an error handling logic using primitives is to achieve a query processing system. Hence, there is a need to be able to lift the secondary error data flow and make it accessible as normal data to be processed, stored, dropped or reported. To provide Container Component Access, the sanitize( ) operator as discussed before the partial result from an error container is simply extracted, or returns the input unchanged if it is not an error container. Because it is frequently used below, ϕ( ) is defined as the algebra operator name for sanitize( ) to keep things short. The error values in a container are accessible though ξ(X).

$$\varphi(X) := \begin{cases} P & \text{if } X = \varepsilon(P, E) \\ X & \text{otherwise} \end{cases}$$

$$\xi(X) := \begin{cases} E & \text{if } X = \varepsilon(Y, E) \\ \emptyset & \text{otherwise} \end{cases}$$

When defining other operators, in some embodiments the following are applied:

$$\phi(\vec{\chi}) := (\phi(\chi_1), \ldots, \phi(\chi_n)), \text{ and } \vec{\xi}(\vec{\chi}) :=$$
$$\xi(\chi_1) \cup \ldots \cup \xi(\chi_n).$$

In other embodiments, operators are also provided to create error values and containers, but omit their definitions here to save space, as they are rarely needed by application pro grams.

The error functions are defined as:

$$errors(X) := \{convert(e) | e \in \xi(X)\},$$

where convert is a function that turns error values into plain records.

Error Tolerance Limits—The limitErrors( ) introduced earlier can be easily defined based on the error model. It takes a predicate c describing a class of errors and an error count t as parameter, and returns a nondeterministic output defined by $$limitErrors_{c;t}(X) := \begin{cases} \varepsilon(Y, Z) & |\{x \in \xi(X) \mid c(x)\}| > t \\ X & \text{otherwise} \end{cases}$$

for some $Y \subseteq \phi(X)$ and $Z \subseteq \xi(X)$ such that $|\{\chi \in Z | c(\chi)\}| > t$ Again note that the definition leaves open which exact subsets of the errors and values are returned. The only guarantee is that the result is unchanged if at most t errors occur, and that more than t error values are returned if the threshold was violated. This non-determinism allows for more efficient implementation strategies, as discussed earlier.

Declaration of Acceptable Schemes—The accept( ) "function" described earlier does not perform any transformation—on a logical level it is just the identity operator for its first input. However, the second parameter is a user-defined specification of the schema inference function, declaring which schemas are allowed as input. This is used by the compiler to control the production of partial results.

Extending Error-unaware Operators—The purpose of most query operators is unrelated to error processing, and their semantics is defined in terms of regular input data. This section shows how to imbue error-unaware operators with the capability to process error containers in their input. While it is possible to define specialized error container semantics for each operator from scratch, in one embodiment a uniform framework. This way, all operators, predictably are simplified, implementation wise.

To extend an operator which does not allow for error containers, in some of its inputs, two options can be considered for each such input. Option one is to pass the error container through to the output, without producing a partial result. Option two is to evaluate the operator using the error container's partial result while also propagating any errors. Given an n-ary operator f, by choosing either option for each input, a $2^n$ error-aware variants of that operator is obtained as follows. One error aware variant $$\hat{f}_p$$

for each subset p of $\{1, \ldots, n\}$. The indices:

$$i \in p$$

correspond to those input of f which are processed according to option one above:

$$\xi_p(\vec{\chi}) := \cup_{\chi_i \in p} \xi(\chi_i)$$

The set of errors is from inputs p only. First the auxiliary operators are defined as $f_p$ that bypass the underlying operator f when there are errors on the inputs in p, and sanitizes the other inputs in p, ϕ( ). In other terms, f' "routes" any errors around f and produces a partial result if the inputs in p are error-free.

$$f'_p(\vec{x}) := \begin{cases} f(\varphi(x)) & \text{if } \xi_p(\vec{x}) = \emptyset \\ \emptyset & \text{otherwise} \end{cases} \quad (1)$$

The extended operator:

$\hat{f}_p$ applies $f'_p$, and preserves any error by merging them from the input using.

$$\hat{f}_p(\vec{\chi}) = \mu(f'_p(\vec{\chi}), \xi(\vec{\chi}))) \quad (2)$$

A family of error-aware variants f with varying behavior can now be introduced with respect to errors. If a full set of inputs are selected for p, the resulting variant $\hat{f}\{1, \ldots, n\}$ Implements classical exception handling, where the occurrence of an error in a sub-expression aborts evaluation of the parent expressions. This is always a "safe" option in the sense that does not run into danger of producing incorrect partial results. For the other variants with some inputs missing from p, the transformation described above is particularly useful if the allowed inputs of error-unaware operators include the empty collection. This is the case for Jaql as explained. The same applies to other languages as well. It was also explained how the compiler chooses the error aware variant of an operator automatically, based on the accept declarations and the query operator semantics.

Run-Time System: The query language and corresponding logical algebra give an elegant way, in one embodiment, to formally describe queries with partial results and their semantics. Turning now to their efficient implementation, the Jaql run-time system is based on Java. Therefore, the assumption is that any errors are raised as Java Virtual Machine (JVM) exceptions, although the methods can be easily adapted to most other exception-capable platforms such as C++ or the Common Language Runtime of .NET. Below, an example is shown as how to avoid materialization of error containers with partial results and error values by representing them as iterators, and discuss how to realize the various error-aware logical operators and variants using physical iterators.

Error Container Representation—Error containers contain partial results and all accumulated error values. A frequent special case of error container is if there is an empty partial result, and only a single error value. For the inputs in p according to definition (1) above, one not need to evaluate f but pass the error through to the parent expression. This exactly corresponds to exception handling, and JVM exceptions as an optimized error delivery mechanism for these cases can be used. For other error containers, an iterator model is used to avoid materialization of intermediate results as much as possible. In one embodiment, the partial result is merged with the errors into a single iterator. It is then indicated for each item as whether it is an error value or a regular data item. This means that consumers can only detect whether an iterator represents a regular result or an error container once the first error value is encountered, or once the iteration has completed. This is a limitation for implementing definition (1), because to decide whether to invoke f or bypass it, the run-time system must know whether there are errors in any of the inputs in p. Some operators, including blocking operators (such as MapReduce) and all operators that produce singletons, by definition always report errors before returning partial results—so whether or not to invoke f can be decided before a partial result arrives. For other inputs in p, the compiler must add a materialization operator.

Error Conversion—The errors( ) function is just a simple transformation from error values to regular data values—essentially this is an iterator which just flips the indicator that specifies whether a value is an error or a regular data item.

The Iterator ($\phi$)—The physical w iterator implements the $\phi$ operator from before. It extracts partial results from error containers by consuming its input and passing through any non-error values as output. Further, it is parameterized with an object which must implement an error target interface that consists of a single method reportError. This method is called for every error in the input. The w iterator is used as implementation of the language function sanitize( ) by supplying an error target which does nothing when reportError is called. This drops all errors. Another task of $\phi$ is the conversion of JVM exceptions. Whenever it encounters an exception while traversing its input iterator that represents a condition that can be safely treated inside the query, it catches the exception, converts it into an error value, and reports it to the error target. The $\phi$ operator also accepts an additional parameter that specifies which information from execution engine's state to include with error values. This is extracted by the compiler from any applicable errors( ) function. The iteration will stop after returning the error value, because a downstream JVM exception means that the input iterator is in an unsafe state now.

The $\mu$ iterator—The $\mu$ operator is used to create variants $\hat{f}_p$ according to definition (2). Each variant corresponds to an iterator for f wrapped between a parent $\mu$ operator and $\phi$ operators on all of the inputs not in its p set. Note that in definition (2), the inputs: $\vec{\chi}$ are used twice, once as input to f'p and once to propagate the errors. Of course, it is not important to evaluate the sub-expressions whether a value is an error or a regular data item. To evaluate the sub-expression corresponding to the inputs twice, the iterator protocol can be bypassed. The $\mu$ iterator is used as error target for w instances, and buffers the error values they report using the reportError method. The application of n in definition (2) corresponds to the contents of this buffer. The $\mu$ iterator returns both the partial result from its input iterator (f'$_p$ in (2)), and the error buffer (corresponding to the application of n). Whenever a new result item is requested, $\mu$ always returns the contents of the error buffer before requesting a new value from f'$_p$. This minimizes the required buffer size, as only the errors that occur between two iteration steps need to be buffered. This physical implementation of definition (2) also explains why the approach can be extended to dependent sub-expressions. A dependent sub-expression contains free variables that are bound by a parent operator during evaluation. The implementation works fine if an operator implementation evaluates a sub-expression several times, with different values for the free variables: The sub-expression includes w iterators, so the operator only sees the partial result, while the union of the error values of all evaluations is sent to $\mu$.

Example Plan—An example illustrating the physical operators and different error flow representations is shown in FIG. 6. FIG. 6 provides four paths represented by arrows 610 for JVM exceptions, 620 for Mixed iteration flows, 630 error free iterator and operation; and 640 the ReportError calls. The elements of each flow will be discussed separately below.

FIG. 6, in general provides for an embodiment that defines an execution plan that evaluates a running example from earlier, with the error handler. The automated generation of such plans will be discussed later. A simplified plan is discussed herein for clarity. One simplification is that group by is not rewritten into a Hadoop job, but realized as a monolithic operator. In addition, the parameter expressions and the error-related data-flow are only shown for the transform operator that adds the language annotation. It has two sub-expressions, one that delivers the input documents, and the expressions that creates the transformed record by merging the copied input record and the language field. In the example, various φ operators catch exceptions raised by their sub-expressions and report them to the μ operator.

The latter makes errors available to the LimitErrors operator using an iterator that mixes errors and regular data values. The error-unaware operators (rounded boxes) only have error-free iterators as input. As an optimization, there are no μ operators on top of the record constructor and the transform operator. Note that, if the language analysis UDF fails by throwing a JVM exception, this is captured by j' and reported to μ, and the record constructor is still evaluated. This corresponds to the accept declaration, which lists lang as optional. However, if copying the mandatory remaining fields should fail, record construction is bypassed using JVM exception handling, as indicated by the exception flowing directly into the j on top of the record constructor.

MapReduce—MapReduce is the core physical operator for parallelization in the system and it is crucial that error handling itself can be parallelized and does not introduce additional MapReduce jobs. In the MapReduce paradigm, inputs, outputs and intermediate results are stored in files on local and distributed file systems. The MapReduce APIs do not allow direct communication between different tasks, preventing the use of the μ/' buffering operator combination described above. Hence, a specialized error-aware variant of the MapReduce operator is chosen, which integrates errors into the regular MapReduce dataflow, and buffers any error values in files like regular data. This variant is generated by rewriting the map and reduces functions supplied to the error-unaware MapReduce operator. The differences are Map functions must return key/value pairs, but error values do not have any key value associated with them. To comply with the interface, to every error value an artificial error key is added. The error keys are distinct from all regular reduce key values, and a different such artificial error key is used for each map task. This ensures that all the errors from the map phase are partitioned, and error processing code in the reducers can be load-balanced by the MapReduce run-time. The reduce function and the consumer of the MapReduce output must use φ to again represent errors as reportError calls.

LimitErrors—The LimitErrors operator is implemented using a simple counter in its state. Initially, it just copies any values from its input to its output, increasing its error counter whenever it receives an error value from its input iterator that satisfies the predicate parameter. When the error counter reaches the threshold, the input iterator is no longer consumed, and no further results are returned. In a distributed system, there is an additional challenge to face and that is of the distributed state management for the error counters when LimitError operators are used in the map or reduce functions. To avoid unnecessary work, it is desired to terminate processing as early as possible. Error limits apply to jobs as a whole, not to single task instances, but a LimitError operator executed in a distributed task only maintains a local error count. Only tasks that violate the error limit on their own would avoid doing unnecessary work due to early termination of the LimitError iterator. This can be detected by the global violation by counting produced errors after the job is finished but it would be a waste of resources which will significantly increase the latency with which the user is notified of the condition. In one embodiment, the Hadoop's user-defined named global counters can be used to coordinate early termination. These easily solve the problem, but require some trade-offs to balance network bandwidth and termination latency, similar to distributed top-k processing.

Compiler—The Jaql compiler takes a query string as input, and parses it into an abstract syntax tree. Then, a rewrite engine converts the high-level Jaql constructs into efficient low-level physical functions. One core optimization is to rewrite parallelizable operations such as transform, join or group by into Hadoop MapReduce jobs. The execution plans (such as the one shown in FIG. 6) are again represented as expression trees based on physical operators such as MapReduce. The focus now turns to the error handling part of the compiler. It consists of three major tasks. The first is to select which error-aware variant to use for each error-unaware operator. The second is to inject the physical operators explained earlier into the chosen variants, which will amount to a straight rewrite process. The third is to perform error-specific optimizations on the execution plan.

Automatic Choice of Operator Variants—The method described results in a large number of error-aware variants for each error-unaware operator to choose from. In some cases, the developer may want to explicitly specify which variant to use by explicitly placing φ. However, this is not a composable strategy—it is essentially the same as explicitly catching exceptions on the local subexpressions. Instead, it is desired for the compiler to choose the error-processing strategy automatically, based on the accept declarations and the query operator signatures.

Variants as Overloaded Operators—To automate the selection of error-aware operator variants in a composable way, schema inference is used. Essentially, the family of error-aware variants of each operator is a case of operator overloading. The problem of choosing the variants is the problem of overload resolution. The compiler has to find a choice of operator variants that is type-safe with respect to the query, i.e. no operator is applied to a result that it is not defined on—including the user-provided accept declarations. Among all such type-safe candidate assignments, it is desired to choose the one that allows the most partial processing. Whenever there are multiple eligible choices, the ties is broken by falling back to "safe" variants. As an example, consider the Jaql query Q: concat(g( ) h( )->accept (schema [int,long?]);

It concatenates the outputs of two functions g( ) and h( ), producing an output array. g( ) and h( ) produce a singleton output of type int and long, respectively. The query declares using accept that the long value is optional. Hence, the compiler should choose the variant of concat that always matches this acceptable schema and allows the most partial processing.

The desired variant is the one that returns a partial result if h( ) fails (because the long value is optional in the accepted schema), but propagates the exception to the caller on an error in g( ) (because the int value is mandatory). In order to formalize the overall problem, first it is desired to define the notion of schema and explain how the embodiment provides for the model inference of schemas for expressions of the query algebra.

Schema Inference—In one embodiment, the technique assumes a set S of schema expressions which describe constraints on data values. Given input schemas, schema inference allows to determine the output schema of a query and its subexpressions, as explained below.

For a schema s S, $\iota \in i$ a value x, $\chi \in s$ mean x conforms to s. Subsequently, $s_1 \subseteq s_2$ if, and only if s1 is $\chi \in s_1 \Rightarrow \chi \in s_2$,1, the schemas S are the expressions of its schema language. In this embodiment, dependence on the precise set of primitives of that schema language is not provided except for a schema union operator | which is defined as a $\iota \chi \in (t_1|t_2) \Rightarrow \chi \in t_1 \vee \chi \in t_2$.

The use of $\phi$ is to denote the empty schema to which only the empty collection conforms, and * for the schema to which every value conforms.

Error Containers—$\epsilon$ is used to describe a schema to which all error containers conform whose partial result conforms to s. A schema s allows for error containers if there is some $\chi \in s$ with $\chi \in \epsilon(*)$.

A schema that allows for error containers can always be represented as a simple union of an regular schema and an error container schemas=sr|E s=$s_r$|$\epsilon(s_p)$se error containers can only occur at the top level. The sanitized schema of s is the union of the regular and the partial result schema:

$$\phi(s) := \begin{cases} s_r \mid s_p & \text{if } s \equiv s_r \mid \varepsilon(s_p) \text{ for some } s_r \text{ and } s_p \\ s & \text{otherwise} \end{cases} \quad (3)$$

The regular schema of s is the schema without the error container part $$\rho(s) := \begin{cases} s_r & \text{if } s \equiv s_r \mid \varepsilon(s_p) \text{ for some } s_r \text{ and } s_p \\ s & \text{otherwise} \end{cases} \quad (4)$$

$f(x_1, \ldots, x_n) \in$

An error container without partial result 1 $\epsilon(\emptyset)$s the case where
the operator throws an exception.

For each operator f, an associated schema inference function is required:

$\tau \langle f \langle : S^n \rightarrow S$.

It represents the operator's type signature by specifying the output schema of the operator for given input schemas. It can also be assumed, $\perp \in S$ in one embodiment that a special schema that rep $\langle f \langle (\vec{s})=\perp$ defined values, and write if the operator is not defined on the combination of schemas described by $\vec{s}$.

Applying $\tau_3 \langle \langle$ bottom-up to an expression tree will yield its result schema. Now to define $\tau$ <f> for some operators introduced before, the schema inference function for $\phi$ yields the sanitized input schema $\tau < \phi > (s): = \phi(s)$. For these purposes, accept( ) is actually a family of operators accept$_a$( ), one for each schema a. In one embodiment, accept$_a$( ) accepts all inputs whose regular or partial result conforms to a. In other words, the sanitized schema of the input must be a subschema of a. Since any operator may raise an exception which the model represents as error container with empty partial result, one must also allow the empty collection. Hence, the schema inference function for accept$_a$( ) is $$\tau \langle \text{accept}_a \rangle(s) := \begin{cases} \phi(s) & \text{if } \phi(s) \subseteq (a \mid \emptyset) \\ \perp & \text{otherwise} \end{cases} \quad (5)$$

In one embodiment, the operator variants from previous discussion have schema inference functions that are derived from their respective base operator signatures. Recall that (2) defines for each f a set of variants, one for each set p describing the inputs on which partial results as inputs are not allowed. A variant can only safely produce partial results if it is defined on both the regular schema and any partial results from some of the input error containers. To capture this, in one embodiment, it is the sanitized input schemas are conditionally defined. In this manner, they omit the partial result schema for inputs that are in p, because those partial results are not processed. For inputs that are not in p, the sanitized schema is used:

$$\phi_p(\vec{s}) := (\phi_p^1(s_1), \ldots, \phi_p^n(s_n)),$$

$$\text{with } \phi_p^i(s) := \begin{cases} \phi(s) & \text{if } i \notin p \\ \rho(s) & \text{if } i \in p \end{cases}$$

For the schema inference function for the operator variant $\hat{f}_p$ as defined in (2), it is needed to combine the error-free case with the case of conditionally sanitized schemas. If no partial inputs are processed, there cannot be a partial result other than an exception. If f is not defined on the conditionally sanitized schema, this operator variant cannot be used, and must be undefined. With $s_\rho := \tau \langle f \langle (\rho(\vec{s}))$ denoting the schema of f for the error-free case, in one embodiment:

$$\tau \langle \hat{f}_p \rangle(\vec{s}) := \begin{cases} s_\rho \mid \varepsilon(\emptyset) & \text{if } p = \{1, \ldots, n\} \\ s_\rho \mid \varepsilon(\emptyset \mid \tau \langle f \rangle(\phi_p(\vec{s}))) & \text{if } \tau \langle f \rangle(\phi_p(\vec{s})) \neq \perp \\ \perp & \text{otherwise} \end{cases} \quad (6)$$

This definition can now be used to determine whether an operator variant can be used in an execution plan, based on the input schema and the expected output schema, as explained below.

Example: Looking at the introductory query Q above as an example, a better understanding of how schema inference is used to choose correct operator variants can be provided. However, as can be appreciated by those skilled in the art, other schemes can be provided in alternate embodiments.

For this example, some more primitives are needed for the schema language: There are base types int and long, and fixed size arrays with a specified schema for each element, denoted by [s1, . . . , sn]. As algebraic expression for Q, using c as symbol for concat:

$e = \text{accept}_{[int]|[int,long]}(c(g(\ ),h(\ )))$

The schema inference functions for g and h indicate that these may be raised as exceptions $\tau \langle g \langle (\ )=[int]|\epsilon(\emptyset) \tau \langle h \langle (\ )=[long]|\epsilon(\emptyset)$ The inference function for concat simply appends the components of each input array $\tau \langle c \langle ([s_{11}, \ldots, s_{1n}], [s_{21}, \ldots, s_{2n}])=[s_{11}, \ldots, s_{1n}, s_{21}, \ldots, s_{2n}]$ The problem for the compiler is now to find an assignment of algebra operators to error-aware variants that is type-safe. Let s be the schema inferred for e given an assignment. The assignment is typesafe if $s \neq \bot$. It should be noted that "c" is defined for arbitrary error-free inputs, so the only remaining constraint is that accept must be defined. According to Def. (5), in this example:

$$\phi(s) \sqsubseteq [int,long] | [int] | \emptyset.$$

For the 0-ary g and h there is only a single variant each, which is the same as the function itself. According to definition 2, for c, there are four variants $$\hat{c}_\emptyset \hat{c}_{\{1\}} \hat{c}_{\{2\}} \hat{c}_{\{1,2\}}$$

Applied to the input schemas from g and h:

$$\phi(T<\hat{c}_\emptyset>(T<g>(\ ),T<h>(\ )))=[int,long]1[int]1[long]1\emptyset$$

$$\phi(T<\hat{c}_{\{1\}}>(T<g>(\ ),T<h>(\ )))=[int,long]1[int]]1\emptyset$$

$$\phi(T<\hat{c}_{\{2\}}>(T<g>(\ ),T<h>(\ )))=[int,long]1[long]]1\emptyset$$

$$\phi(T<\hat{c}_{\{1,2\}}>(T<g>(\ ),T<h>(\ )))=[int,long]1\emptyset$$

The accept requirement is only met by variants $\hat{c}_{\{1\}}$ and $\hat{c}_{\{1,2\}}$ Whenever these multiple choices apply, the variant which allows as much partial processing as possible is used which in this case would be $\hat{e}_{\{1\}}$.

Problem statement—As way of an example, now a formal problem statement for a compiler that automatically choses error-aware operator variants will be discussed. Let e be a query expression constructed from m sub-expressions $e_1, \ldots e_m$, with $e=e_1$ being the root. Each $e_i$ is of the form $e_i = f_i(e_{c_1^1}, \ldots, e_{c_1^n})$, with designating the index of $c_i^j$, the jth child expression of $e_i$. An expression e is type-safe iff for all $e_i$ with schema $s_i$, it holds that $$s_i = \tau \langle f_i \langle (s_{c_i^1}, \ldots, s_{c_i^n}) \text{ and } s_1 \neq \bot$$

In one embodiment, it is also designated with v(f) the set of operator variants of some operator f. Given an expression e, an assignment $v(f_1) \times \ldots \vec{v} \in f_m)$ maps operators fi to error aware variants $v_1 \in v(f_1)$. Let $e|\vec{v}|$ be e with every operator $f_i$ replaced by its assigned variant $v_i$. An assignment $\vec{v}$ is type-safe if $e|\vec{v}|$ is type-safe.

An assignment $\vec{w}$ for just the operators of a sub-expression $e_i$ can be extended to an assignment for the whole e if the partial result of $e_i$ under $\vec{w}$ can be used to continue processing with the remaining operators of e: Let e' be the expression e with $e_i$ replaced by $\phi(e_i|\vec{w}|)$. Then $\vec{w}$ is viable for e iff e' is type-safe.

There may be multiple type-safe assignments for e, in which a choice needs to be made. For the error-aware variants v(f) according, a partial order can be defined for i.e. a variant th $\hat{f}_p \geq \hat{f}_q \Leftrightarrow q \subseteq p$, esults on a superset of inputs is greater. The least element according to this order is $\hat{f}_{\{1, \ldots, n\}}$, the variant that performs plain exception handling on all inputs.

Inefficient assignments, where some sub-expression produces partial results which its parent does not use, needs to be avoided. An assignment is efficient if for every i holds: If $v_i$ does not process partial results from input j, the $v_{c_i^j}$ is the least variant o $v(f_{c_i^j})$.

For a given candidate set of variants, it is desired to use the one which performs the most partial result processing. However, there may not always be a unique greatest element because these variants are only partially ordered. For sub-expressions where there is no unique greatest variant, it is okay to give up partial result processing in favor of predictable behavior, and fall back to plain exception handling: Let $V_i(e)$ be the set of all efficient assignments for $e_i$ which are viable for e. An assignment is unambiguous I iff for all i, $v_i$ is the greatest variant in $V_i(e)$, if it exists, or the least variant of $V_i(e)$ otherwise. The compiler has to find an assignment $\vec{v}$ for e which is type-safe, efficient and unambiguous.

Algorithm—The algorithm to solve the problem is quite simple. It processes the query expression bottom up, enumerating type-safe, viable variants for each sub-expression based on the input types, and retaining the greatest variant (or the least variant, if no greatest exists). Viability is tested by checking the schema of a modified expression tree e' as in the definition above. This algorithm can be viewed as a very simple form of bidirectional type inference, deriving the schema bottom-up but also bounding it by the expected return type. The algorithm has a worst-case running time of $O(2^n m^2)$ where m is the number of subexpressions and n is the maximum operator arity. Although exponential, it is well suited for practical applications, because operator arity is typically small, and at most two candidate assignments are propagated up the tree for each subexpression, the greatest (if it exists), and the least. Under resource pressure, the algorithm can abort a complete search and still produce a plan by falling back to the safe variants (i.e. plain exception handling) for some subtrees, and issue a warning to that effect.

Optimization—The rewriter performs various optimization rewrites that are specific to error handling. Two examples can be given. First $\mu$ can be omitted. In the straightforward implementation of the scheme as per one embodiment of the invention, every "legacy" operator is wrapped in $\phi$ and $\mu$ operators, causing error values to hop from $\mu$-buffer to $\mu$-buffer. However, since only a few operators actually need to access the error values, the compiler does not actually add $\mu$ after every operator. Only if the consumer of a result is an operator that is explicitly defined on error containers, such as LimitErrors, $\mu$ is necessary. In all other cases, the 'iterators deliver errors directly to the buffer of the closest ancestor $\mu$ in the expression tree. An example for such a plan is shown in FIG. 6. Limit Pushdown. The purpose of the LimitError operator is to make sure that one terminates query execution as soon as it becomes apparent that an error threshold is violated. In the case of blocking operators, additional LimitError instances can be added to avoid having to wait for the blocking operator to finish. For clarity purposes, this technique can be referred to as the Limit pushdown. Unlike filter pushdown which moves filters down the expression tree, one does not move the original LimitError, but add additional identical copies to the input expressions of every blocking operator. A relevant case is again that of MapReduce and therefore one must make sure to have LimitError instances in every task to ensure that tasks can detect a distributed error limit violation.

It would be also helpful if a brief investigation of the performance is also discussed, especially since injecting additional operators into execution plans is not without cost. Fortunately, if error-handling is not used, error-handling operators are not injected, resulting in no overhead.

Cost of the φ iterator—When error-handling is used, the most frequently injected iterator is φ. In a first experiment, the increased CPU cost was measured for executing φ. Two simple queries can be executed on a single node with a variety of execution plans and error rates. Note that this experiment represents a worst case scenario—the queries are as simple as possible and all overheads associated with expensive functions, I/O, cluster computing, and multi-user workloads were removed. The first query, Scan, creates 10 million records, and then applies a UDF to each record. For a certain fraction of the records, this UDF raises an exception, for the others, the record is passed through. The final operator counts the records. The second query, Group, performs the same operations with an additional group by, forming 10000 equal sized groups and counting the records per group. For both queries, any errors that occurred were dropped by applying sanitize( ).

Three execution plans where used for the first query. (1) Plain: no plan instrumentation. (2) Inject: a plan with injected error iterators. In the example, each record passes through three 'iterators and a single μ. (3) Inline: a plan with hand-coded variants of the operators, where the' code was inlined into the operator implementation. The plans that could tolerate errors where executed with three different error rates for the UDF: No errors, 1% (100000) and 5% (500000). For the Group query, let's compare noninstrumented and injected φ plans only. The run-times of the queries were obtained on an Intel Core Duo® processor with 2.66 GHz using the Hotspot 1.6.0 JVM. The average response time over 40 runs per experiment is shown in Table 1.

TABLE 1

Performance overhead of φ

| Query | φ-Plan | 0% | 1% | 5% |
|---|---|---|---|---|
| Scan | Plain | 4.44 (0%) | NA | NA |
| | Inject | 5.18 (6.7%) | 6.68 (50.5%) | 11.81 (166%) |
| | Inline | 4.45 (0.2%) | 6.59 (48.5%) | 11.62 (162%) |
| Group | Plan | 35.67 (0%) | NA | NA |
| | Inject | 37.98 (6.5%) | 39.85 (11.7%) | 44.06 (23.5%) |

Per error rate, sec(overhead %)

The focus was on the differences in runtime cost so this was excluded from Jaql's startup overhead (e.g., jar loading, compilation). For the error-free case of the Scan query, the Injected plan had an overhead of 16.7% compared to the Plain plan, which corresponds to about 200 CPU cycles more per tuple. This is mainly caused by the increased iterator call stack depth—as illustrated by the Inlined plans, where the overhead collapsed to very few instructions per try/catch block. As the error rate increased, Scan overhead substantially increased, due to error creation and buffering.

The Group query is slightly more complicated, therefore adding more work per tuple (e.g., compute hash values) which resulted in less overhead (6.5%) from'. Considering that typical ingestion workloads perform even more expensive steps requiring thousands or millions of cycles (e.g. document parsing), the relative overhead would be even less.

Distributed Execution—For the second experiment, the Scan query was run on a Hadoop cluster, using as input 200 million records stored in HDFS instead of generating the records in memory as above. Each record had a payload field of 128 bytes in addition to its id, for a total input size of 30 GB. The corresponding execution plan ran a MapReduce-MapReduce job on a 20 node Hadoop 0.20.2 cluster with 8 cores (2.8 GHz) each. The average run-time across 10 runs was 124s (without the startup overhead of Jaql and the Hadoop job). The average differences between the Plain plan, Injected φ and Inlined φ plans were less than half a second with a variance of several seconds between runs, making the difference insignificant.

It is important to appreciate several concepts as discussed above. First in examining programming languages, it should be pointed out that the classical try/throw/catch exception is similar in most imperative programming languages. Applications have to perform their own error reporting, typically based on side effects such as logging. In view of this, resumable exceptions can be defined as callback hooks. Using these hooks requires knowledge about the exception-signaling code, which contradicts the goal of a declarative programming model. In functional programming languages, monads are used to describe cross-cutting aspects of computations. For example, the Error monad is the functional programming equivalent of exception handling, allowing any computation to result in either a regular value, or an error value. Error values bypass any dependent computations until they reach an enclosing handler.

In some of the embodiments discussed earlier, errors are not treated in a monadic style. In contrast, a family of different monads are introduced that may not only produce an error result, but also produce partial results in expressions that depend on erroneous computations.

DBMS—Conventional query languages have only very limited error handling facilities, in particular when combined with user-defined functions. Query processors fail atomically on a per-query granularity, returning no partial result. This way, some of the data and control flow are moved outside of the query processor, limiting the impact of the query optimizer. Some query languages (e.g. XQuery 3.0 [20]) allow per expression try/catch exception handling, specifying an alternative result for a sub-expression if its evaluation fails.

NULL values provide some capacity for partial results in query languages, representing unknown or unavailable results. Operators must include special cases for NULL value semantics, which in some cases can even be configured. For example, International Business Machines® DB2 supports a "friendly arithmetic" configuration that produces NULL values for arithmetic exceptions (overflow, division by zero, . . . ) instead of complete query failure. Query languages for semi-structured data often have special case semantics if input data does not conform to the expected input schema. For example, in XQuery path expressions return empty sequences if specified elements are missing, and empty sequences have special associated operator semantics for Boolean and numeric arithmetic. Bulkload tools for DBMS frequently allow to skip data that violates integrity constraints, collecting it in "exception tables". However, this feature is specialized, and not available as generic, composable query operator. A different approach may allow constraint-violating data to persist, but mark it as exceptional. The integrity constraints are modified to allow exceptional values. Subsequent access to exceptional values again raises exceptions, and applications can implement any specialized semantics for such values by providing exception handlers in the style of ETL Systems. Extract, Transform, Load (ETL) systems provide a rich, graphical canvas to specify data flows, for example, to ingest data into data warehouses.

Data flows are represented as a DAG of operators (nodes) and channels (edges). An error channel can be specified per operator to handle error inputs. Errors can be handled by simply logging to a file or more flexibly, feeding the problematic data back into the DAG for further processing. This task may be motivated by such first-class handling of errors, but adds nonintrusive, declarative error handling specifications that are composable, can be specified separately from the main data flow, and folded seamlessly into optimization. Big Data Systems. Hadoop provides some configurable support for recovering from deterministic errors with limited modification of user code. One method allows tasks to report which range of input records they currently process. Failing tasks are retried, skipping the problematic range. Hadoop can also be configured to commit a job result even if some number of tasks fails completely after multiple attempts. In this approach, repeated execution of tasks is unnecessary, because instrumented execution plans are used with a more fine-grained view than whole tasks. For example, in one embodiment, the Sawzall language can be used to implement map functions for MapReduce jobs. Operations that raise an error return an undefined value. The semantics of all operators includes a case for undefined values, similar to NULL values above, which does not stop computation, but propagates the undefined value. If an undefined value is introduced, depending on configuration, the corresponding input item is logged or the whole job is aborted. In another embodiment, Inspector Gadget, can be used by PIG for a range of debugging tasks in Hadoop-based data flows. Essentially, it is a set of customizable physical operators that are added to execution plans. The operators can tag, report and suppress data, relying on global inter-operator communication. To use the debug operators, developers must provide a plan transformation specification similar to aspect-oriented programming. This specification details which plan edges to instrument with which debug operators, separating application code and error-specific concerns. However, the approach is not declarative as it requires knowledge about the used execution plan and does not interact well with optimizers. Their paper does not discuss how to use the framework to make data flows more robust, but focuses on provenance issues.

As discussed in some of the embodiments above, an approach to error management in query processing systems for data-intensive applications is provided that produces partial results in the presence of run-time errors. As explained, this was managed by extending a query language and algebra to deal with a novel type that represents partial results caused by errors. In addition, in some embodiments, it a way to declaratively specify what an acceptable partial result is was provided. Furthermore, a method to generate execution plans that comply with these specifications was discussed.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system comprising:
   a parsing block for pre-processing of a document indexing application;
   a filtering block for discarding irrelevant documents;
   a transformation block to clean up and annotate input data by identifying at least one document language;
   a processor configured for grouping inputs to collect documents for a same entity in a single spot, the processor processing a query operation;
   a data package including a data result component, the data result component including data generated based on successful completion of at least a portion of the query operation; wherein the data package also includes an error information data component based on one or more errors encountered during processing of the query operation;
   the processor continuing, as a function of at least one of a number of errors encountered and a class of error encountered, the query operation on data results relating to portions of the query operation that successfully completed;
   an indicator to separate and distinguish the error information data from the data result;
   a memory associated with a distributed file system for storing a final write output relating to the query operation; and
   a compiler that uses the data package for generating a program to optimize processing time by establishing a declarative specification of error tolerance based on previous results.

2. The system of claim 1, the query operation is performed using declarative reasoning.

3. The system of claim 2, wherein the data result includes information and data generated before and after encountering the error and in performance of the query operation; the data result omitting data deemed affected due to encountering the error.

4. The system of claim 3, wherein the error is a nondeterministic error.

5. The system of claim 1, wherein the query operation is performed responsive to receiving a command request.

6. The system of claim 5, wherein a plurality of query operations are performed responsive to one or more command requests.

7. The system of claim 6, wherein the query operations are performed in parallel to one another.

8. The system of claim 7, wherein individual data packages are generated for each query operation including separate data result and error information based upon encountering one or more errors.

* * * * *